United States Patent [19]

Nakano et al.

[11] Patent Number: 5,159,588
[45] Date of Patent: Oct. 27, 1992

[54] OPTICAL PICK-UP

[75] Inventors: Osamu Nakano; Tetsuo Ikegame, both of Hachioji, Japan

[73] Assignee: Olympus Optical Co., Ltd., Japan

[21] Appl. No.: 406,036

[22] Filed: Sep. 12, 1989

[30] Foreign Application Priority Data

Sep. 16, 1988 [JP] Japan .............................. 63-230129

[51] Int. Cl.$^5$ .............................................. G11B 7/135
[52] U.S. Cl. .................. 369/44.22; 369/110; 369/112; 369/44.14
[58] Field of Search ........... 369/44.22, 44.32, 54, 369/106, 112, 44.14, 44.17, 114, 44.15, 44.11, 110, 111, 44.12, 44.21, 44.37; 350/632, 633, 634; 250/220

[56] References Cited

U.S. PATENT DOCUMENTS

| | | | |
|---|---|---|---|
| 4,198,657 | 4/1980 | Kanamaru | 369/44.22 |
| 4,959,824 | 9/1990 | Ueda et al. | 369/112 |
| 4,969,137 | 11/1990 | Sugiyama et al. | 369/112 |

Primary Examiner—Roy N. Envall, Jr.
Assistant Examiner—Hung Dang
Attorney, Agent, or Firm—Parkhurst, Wendel & Rossi

[57] ABSTRACT

An optical pick-up for reading information recorded on an optical record carrier as tracks including a light source emitting a light beam, a collimator lens for converting the light beam into a parallel light beam, a swingable tracking mirror for reflecting the parallel light beam, an objective lens for projecting the light beam reflected by the tracking mirror onto the record carrier, and a plano-parallelo plate arranged rotatably between the collimator lens and the tracking mirror. The plano-parallelo plate is rotated in accordance with the rotation angle of the tracking mirror such that the light beam reflected by the record carrier propagates along the same light path as that along which the light beam is made incident upon the record carrier and any off-set in the tracking error signal can be removed.

7 Claims, 5 Drawing Sheets

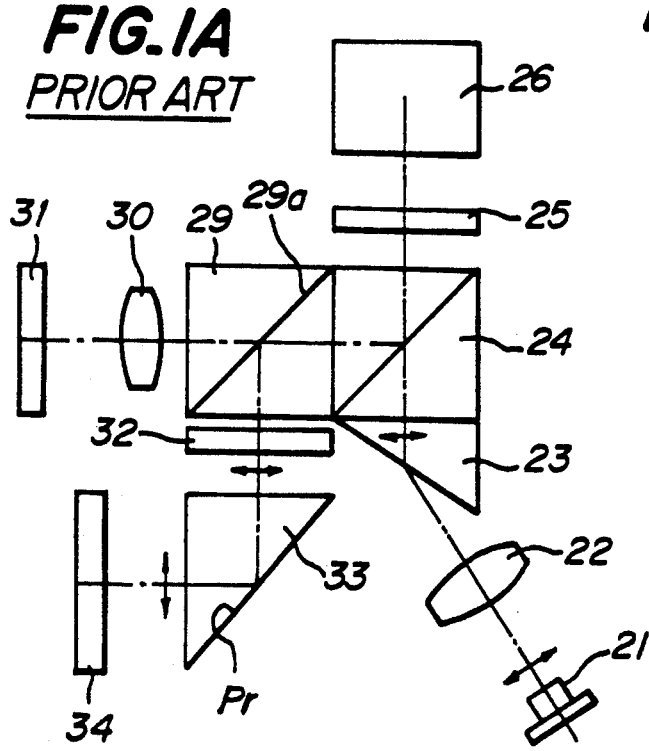
FIG.1A PRIOR ART
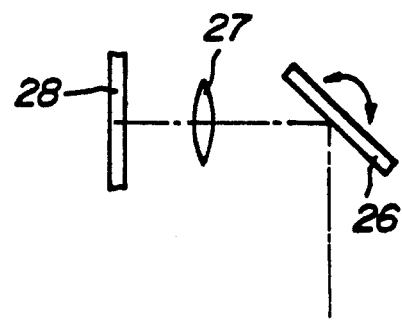
FIG.1B PRIOR ART
FIG.1c PRIOR ART
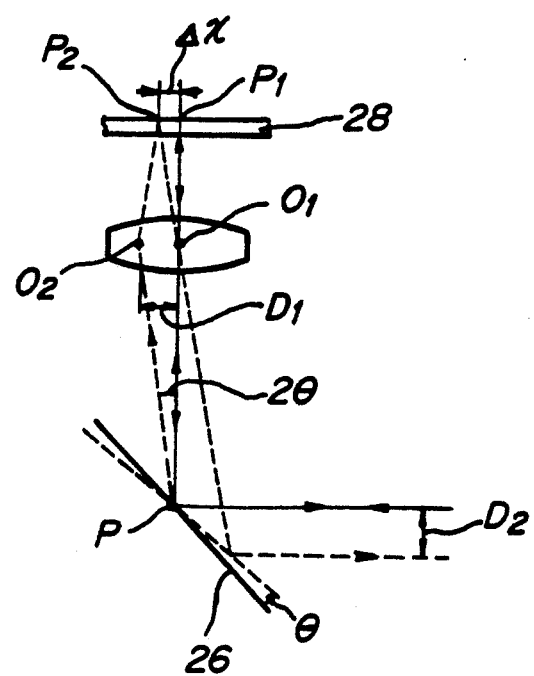
FIG.2 PRIOR ART

OPTICAL PICK-UP

BACKGROUND OF THE INVENTION

Field of the Invention and Related Art Statement

The present invention relates to an optical pick-up comprising a light source means for emitting a light beam, beam collimating means for converting the light beam emitted from the light source means into a substantially parallel light beam, beam converging means for projecting the parallel light beam onto an optical information record carrier as a light spot, information being recorded as a spiral track or concentric tracks, and beam tilting means for tilting the light beam incident upon the converging means to move the light spot on the optical information record carrier in a direction substantially perpendicular to the information track to effect the tracking control.

FIGS. 1A and 1B are schematic views showing a known optical pick-up for recording information on an optical record carrier and reading the information out of the record carrier. A diverging light flux emitted by a semiconductor laser diode 21 and polarized in a given direction is converted into a parallel light beam by means of a collimator lens 22, and the parallel light beam is made incident upon a shaping prism 23 for correcting an intensity distribution in the light beam cross section. The light beam emanating from the shaping prism 23 is then made incident upon an objective lens 30 by means of a polarizing beam splitter 24, a quarter wavelength plate 25 and a swingable tracking mirror 26, and is projected onto an optical record carrier 28 as a fine light spot.

When the pick-up is used to read the information out of the record carrier 28, the light beam reflected by the optical record carrier 28 has been modulated by the information recorded on the record carrier, and is made incident upon the objective lens 27. The light beam emanating from the objective lens 27 is then made incident upon the polarizing beam splitter 24 by means of the swingable tracking mirror 26 and quarter wavelength plate 25. Since the light beam has passed through the quarter wavelength plate 25 twice, the light beam is reflected by the polarizing beam splitter 24. The light beam reflected by the polarizing beam splitter 24 is made incident upon a beam splitter 29 having a half mirror 29a. A light beam transmitted through the half mirror 29a of beam splitter 29 is collected by a collecting lens 30 and is made incident upon a first light detector 31 which produces an information signal picked-up from the optical record carrier 28. A light beam reflected by the half mirror 29a of beam splitter 29 is transmitted through a half wavelength plate 33 and is then made incident upon a detection prism 33 having a reflection plane Pr which is set to a critical angle of reflection with respect to the principal axis of the incident light beam. The light beam is made incident upon the reflection plane Pr as the P-polarized light and the light beam reflected by the plane Pr is made incident upon a second light detector 34 which is arranged at a far field of the objective lens 27.

As illustrated in FIG. 1C, the second light detector 34 has four light receiving regions a, b, c and d. As is well known in the art, the focusing error can be derived by $(a+b)-(c+d)$ and the tracking error can be obtained by $(a+c)-(b+d)$. By driving a focusing actuator in accordance with the focusing error it is possible to effect the focusing control, and by swinging or rotating the swingable tracking mirror 26 in accordance with the tracking error, it is possible to carry out the tracking control.

FIG. 2 is schematic view showing the manner of effecting the tracking control in the known optical pick-up. A pivot center P of the swingable mirror 26 is set at a cross point between the optical axis of the objective lens 27 and the light path along which the principal light ray passing through the optical axis of the collimator lens 22 travels. When there is no tracking error, the light ray passing through the center axis of the collimator lens 22 shown by a solid line is made incident upon the objective lens 27 in parallel with the optical axis thereof and is made incident upon the information carrier 28 perpendicularly thereto. The light ray reflected by the record carrier 28 passes along the same optical path as that along which the incident light ray is made incident upon the record carrier 28.

In order to effect the tracking control, the tracking mirror 26 is swung or rotated by an angle $\theta$ as shown by a broken line. Then the light beam projected onto the record carrier 28 is shifted by a distance $\Delta x$ in the tracking direction. That is to say, when the tracking mirror 26 is rotated by the angle $\theta$, the light beam reflected by the tracking mirror is made incident upon the objective lens 27 with the incident angle of $2\theta$ with respect to the optical axis of the objective lens 27. In other words, the light beam is made incident upon the objective lens 30 at a point $O_2$ which is deviated from the center $O_1$ by a distance $D_1$ as shown by a broken line.

Now it is assumed that the objective lens 30 has a focal length of f, the light ray reflected by the mirror 29 is made incident upon the record carrier 28 at a point $P_2$ which is deviated from the point $P_1$ on the optical axis of the objective lens 27 by a distance of $\Delta x = f \cdot \theta$. The light beam reflected by the record carrier 28 is collected by the objective lens 30 and is reflected by the swingable tracking mirror 26. This light beam is made in parallel with the incident light beam propagating along the optical axis, but is shifted therefrom by a distance $D_2$.

In the known optical pick-up shown in FIG. 1A, when the mirror 26 is swung by the angle $\theta$, the light beam is made incident upon the objective lens 27 at the inclination angle of $2\theta$ and is shifted by the distance $D_1$ with respect to the center point $O_1$ of the objective lens, so that the intensity distribution of the light spot formed on the record carrier 28 is deviated from the symmetrical pattern and the light beam reflected by the record carrier 28 is shifted from the incident light ray by the distance $D_2$, so that the light spot formed on the second light detector 34 has the asymmetrical intensity distribution and is shifted in the tracking direction Tr. This results in that the tracking error signal contains undesired off-set components, and therefore the accuracy of the tracking servo control is decreased.

There have been proposed various methods for removing or mitigating the above mentioned off-set in the tracking error signal. For instance, in Japanese Patent Application Laid-open Publication Kokai Sho 51-22448, there is described a known optical pick-up in which the tracking mirror is arranged to swing about an axis which is on a cross line between a plane including the incident pupil of the objective lens and a plane including the tracking mirror, so that the light beam having the symmetrical intensity distribution is made incident upon the objective lens. In an actual pick-up, the mirror and swinging axis are coupled with each other by means of a resilient supporting member. However, when the swingable mirror is arranged under the focusing actuator, the resilient supporting member might interfere with the focusing actuator, and it is difficult to make a distance from the mirror to the objective lens longer owing to the substantial size of the resilient supporting member.

In Japanese Patent Application Laid-open Publication Kokai Sho 56-134325, there is described another known pick-up, in which the tracking mirror is supported by two springs having different spring constants, so that the mirror is swung as well as is moved linearly. However, in this known pick-up, it is rather difficult to set spring constants of these two springs, the point of the gravity of the mirror, the mirror driving position and so on to suitable values. Further, the sensitivity of the rotation of the tracking mirror is predominantly determined by a difference between the compression and expansion of the two springs, and thus it is very difficult to increase the sensitivity.

In Japanese Patent Publication No. 62-45614, there is disclosed still another known pick-up in which the swinging axis of the tracking mirror is positioned at the focal point of the objective lens. However, from the practical point of view, it is impossible to set the swinging axis at the focal point of the objective lens owing to the lens supporting member and focus driving coil. Moreover, since the position of the tracking mirror is fixed to the focal point of the objective lens, the freedom in designing the mirror arrangement is limited to a great extent.

SUMMARY OF THE INVENTION

The present invention has for its object to provide an optical pick-up in which the off-set in the tracking error signal ca be corrected without making the optical system complicated and decreasing the sensitivity of the tracking driver.

It is another object of the invention to provide an optical pick-up in which the off-set of the tracking error can be removed without decreasing the freedom in designing the optical system.

According to the invention, an optical pick-up comprising light source means for emitting a light beam;

beam collimating means for converting the light beam emitted from the light source means into a substantially parallel light beam;

beam converging means for projecting the substantially parallel light beam onto an optical information record carrier as a light spot, information being recorded as a spiral track or concentric tracks on said record carrier;

beam tilting means for tilting the light beam impinging upon the beam converging means such that the light beam is made incident upon the beam converging means at an inclination angle with respect to an optical axis of the beam converging means to move the light spot on the optical information record carrier in a tracking direction substantially perpendicular to the information track; and beam shifting means arranged between said beam collimating means and said beam converging means and causing the parallel shift of said substantially parallel light beam in accordance with the inclination angle of the substantially parallel light beam to said beam converging means.

In a preferred embodiment of the optical pick-up according to the invention, said beam converging means is formed by an objective lens, said beam tilting means is constructed by a swingable tracking mirror, and said beam shifting means is constructed such that the light beam reflected by the swingable tracking mirror passes through a focal point of the objective lens. Then, the light beam reflected by the record carrier passes along the entirely same light path as that along which the light beam is made incident upon the record carrier, and therefore the deviation in the intensity distribution of the light spot formed on the record carrier does not occur and the undesired off-set of the tracking error can be removed completely.

BRIEF DESCRIPTION OF THE DRAWINGS

FIGS. 1A, 1B and 1C are schematic views showing the known optical pick-up;

FIG. 2 is a schematic view illustrating the operation of the known optical pick-up shown in FIG. 1;

DESCRIPTION OF THE PREFERRED EMBODIMENT

Figure 3:
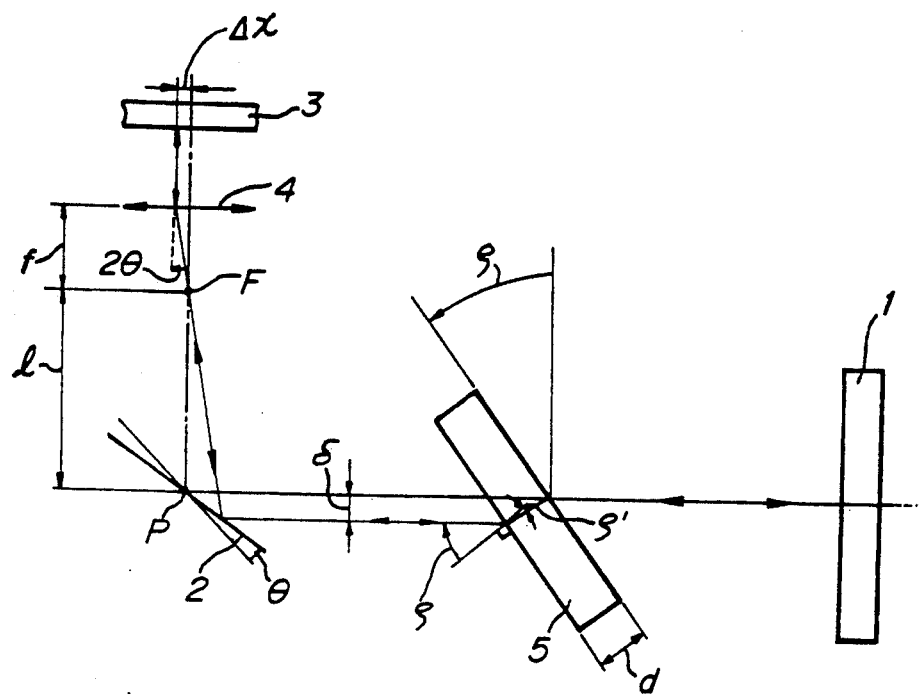
FIG. 3 is a schematic view showing a first embodiment of the optical pick-up according to the present invention.

FIG. 3 is a schematic view showing a first embodiment of the optical pick-up according to the invention. A light beam emanating from a quarter wavelength plate 1 is reflected by a swingable tracking mirror 2 and is projected as a light spot onto an optical information record carrier 3 by means of an objective lens 4. In the present embodiment, between the quarter wavelength plate 1 and the swingable tracking mirror 2 is arranged a plano-parallelo plate 5 rotatably about an axis which is perpendicular to the optical axis. The plano-parallelo plate 5 is made of optical material having a refractive index higher than that of the air.

In FIG. 3, the swingable tracking mirror 2 is rotated by an angle $\theta$ in accordance with the tracking error. It should be noted that the plano-parallelo plate 5 is also rotated by an angle $\rho$ with respect to a direction perpendicular to the optical axis. Therefore, the light beam propagating along the optical axis and being made incident upon the plate 5 is shifted from the optical axis by a distance $\delta$ from the optical axis in the parallel manner.

The light beam parallelly shifted by the plate 5 is then reflected by the mirror 2 and is passed through a focal point F of the objective lens 4. Then, the light beam emanating from the objective lens 4 is projected onto the record carrier 3 perpendicularly thereto as a light beam parallel to the optical axis, but is shifted therefrom by the desired distance $\Delta x$. Since the light beam is made incident upon the record carrier 3 perpendicularly thereto, the light beam reflected by the record carrier propagates along the same light path as that along which the incident light passes, so that the light beam is made incident upon the light detector without any distortion of the intensity distribution and therefore there is not produced any off-set in the tracking error signal.

As explained above, in the present embodiment, the plano-parallelo plate 5 is rotated by the angle $\rho$ in accordance with the rotation angle of the mirror 2 such that the light beam reflected by the mirror passes through the focal point F of the objective lens 4.

Now the relationship between the rotation angle $\theta$ of the mirror 2 and the rotation angle $\rho$ of the plano-parallelo plate 5 will be explained in detail.

At first, the shift amount $\delta$ can be represented by the following equation (1).

$$\delta = \frac{-l \cdot \tan(45° - \theta)}{\cot 2\theta - \tan(45° - \theta)} \quad (1)$$

In this equation (1), l denotes the distance from the rotation center P of the tracking mirror 2 to the focal point F of the objective lens 4. Then, the shift amount $\delta$ may be expressed by the following equation (2).

$$\delta = d \cdot \sin\rho \cdot \left(1 - \frac{1}{n} \cdot \frac{\cos\rho}{\cos\rho'}\right) \quad (2)$$

In this equation (2), d and n represent the thickness and the refractive index of the plano-parallelo plate 5, respectively. $\rho'$ is a refraction angle in the plano-parallelo plate 5 and may be expressed by the following equation (3).

$$\rho' = \sin^{-1}\left(\frac{1}{n} \cdot \sin\rho\right) \quad (3)$$

Figure 4A:
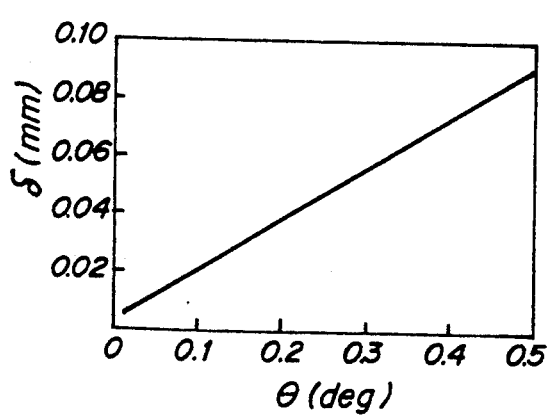
FIGS. 4A and 4B are graphs representing the relationship between the rotation angle and the beam shift amount.

Since the tracking shift amount $\Delta x$ of the light spot on the record carrier 3 may be represented by $\Delta x = 2\theta \cdot f$, when it is assumed that the focal length f of the objective lens 4 is set to 4.3 mm and the shift amount $\Delta x$ is 50 $\mu$m, then the rotation angle $\theta$ of the tracking mirror 2 amounts to 0.33 degrees. It is further assumed that the length l is set to 5 mm, then the shift amount $\Delta x$ has the linear relationship with respect to the rotation angle of the tracking mirror 2 as illustrated in FIG. 4A.

Figure 4B:
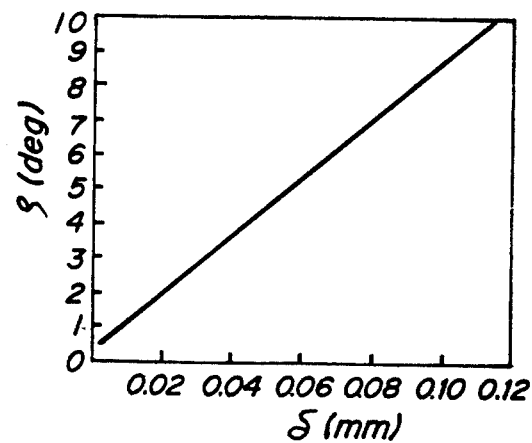

FIG. 4B shows the relationship between the rotation angle of the plano-parallelo plate 5 and the shift amount $\Delta x$. From this graph, it is apparent that this relationship is also linear.

From the above, it can be recognized that the plano-parallelo plate 5 can be rotated by the rotation angle $\rho$ in proportion to the rotation angle $\theta$ of the tracking mirror 2. That is to say, according to the present embodiment, the plano-parallelo plate 5 is rotated in accordance with the inclination angle $2\theta$ of the light beam incident upon the objective lens 4. Since the inclination angle is dependent on the rotation angle of the tracking mirror 2, the plano-parallelo plate 5 may be rotated in accordance with the tracking error. It should be noted that a proportional constant representing the linear relation between the rotation angle of the plano-parallelo plate 5 and the shift amount $\delta$ may be determined by considering the thickness d and refractive index n of the plano-parallelo plate.

Figure 5:
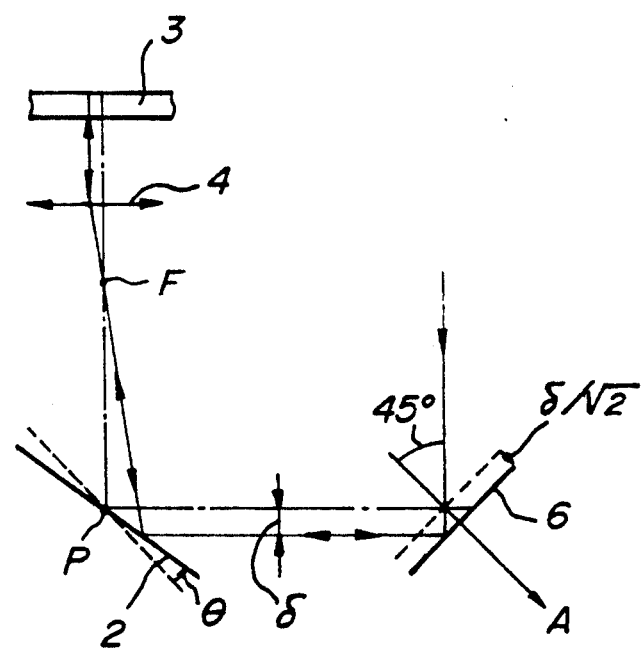
FIG. 5 is a schematic view depicting a second embodiment of the optical pick-up according to the invention.

FIG. 5 shows a second embodiment of the optical pick-up according to the invention. In this embodiment, portions similar to those of the first embodiment are denoted by the same reference numerals used in the first embodiment. A plane mirror 6 is arranged to be linearly movable in a direction shown by an arrow A which is normal to the plane of the mirror. The plane mirror 6 is arranged such that the light beam emanating from the collimator lens not shown in FIG. 5 is made incident upon the mirror at the incident angle of 45 degrees. In the condition shown by solid lines in FIG. 5, the swingable tracking mirror 2 had been rotated by an angle $\theta$ in order to correct the tracking error. Then, the plane mirror 6 is shifted in the direction A by a distance $\delta/\sqrt{2}$. Therefore, the light beam reflected by the plane mirror 6 is deviated from the optical axis by the distance $\delta$. This parallelly shifted light beam emanating from the plane mirror 6 is reflected by the swingable tracking mirror 2 and is made incident upon the objective lens 4 through the focal point F of the objective lens, so that the light beam is projected by the objective lens onto the record carrier 3 perpendicularly thereto. Therefore, the light beam reflected by the record carrier propagates along the same optical path as the incident light beam and the deviation of the return beam with respect to the incident beam is not existent at all and the light spot having the symmetrical intensity distribution can be formed on the light detector at the correct position. In the actual tracking control, the swingable tracking mirror 2 is rotated in accordance with the tracking error and the plane mirror 6 is shifted in the direction A is also shifted in accordance with the tracking error, so that the light spot is formed on the light detector always at its correct position. Therefore, it is possible to detect the tracking error accurately and thus the accuracy of the tracking control can be increased. In this case, since the rotation angle $\theta$ of the swingable tracking mirror 2 has a linear relationship with respect to the beam shift amount $\delta$ and the linear shift amount $\delta/\sqrt{2}$ of the plane mirror 6 has also a linear relationship with respect to the beam shift amount $\delta$, the plane mirror 6 may be shifted linearly in accordance with the rotation angle $\theta$ of the swingable tracking mirror 2.

In the embodiments so far explained, the order of arranging the swingable tracking mirror and the plano-parallelo plate or the linearly shifting plane mirror may be suitably determined by considering the type of the optical system. Further, in the above embodiments, the light beam is set such that it is made incident upon the objective lens through the focal point thereof, but it is also possible to make the light beam incident upon the center of the entrance pupil of the objective lens 4. Moreover, when the movement of the plano-parallelo plane o the linearly shifting mirror is controlled in accordance with the rotation angle $\theta$ of the swingable tracking mirror, it is also possible to derive the control signal for these elements by extracting the low frequency components of the rotation of the singable tracking mirror. Further, the plano-parallelo plate or the linearly moving plane mirror may be controlled by a signal derived from signals other than that for controlling the movement of the swingable tracking mirror.

Figure 6:
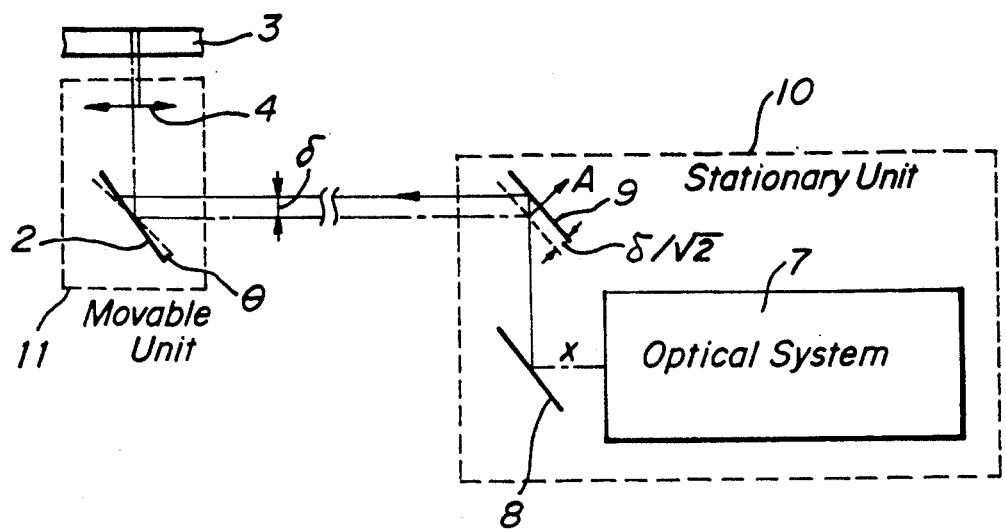
FIG. 6 is a schematic view showing a third embodiment of the optical pick-up according to the invention.

FIG. 6 shows a third embodiment of the optical pick-up according to the invention. In this embodiment, there is arranged the combination of a stationary plane mirror and a linearly moving plane mirror. A light beam x emitted from an optical system 7 including the light source, collimator lens, light detectors and beam splitter is first reflected by a stationary mirror 8 and is then reflected by a linearly moving mirror 9. When the mirror 9 is shifted by a distance $\delta/\sqrt{2}$ in the direction A, the light beam reflected by the mirror 9 is shifted from the optical axis by the distance $\delta$. The optical system 7, stationary mirror 8 and linearly moving mirror 9 are mounted on a stationary unit 10. The swingable tracking mirror 2 and objective lens 4 are mounted in a movable unit 11. The light beam emanating from the stationary unit 10 is reflected by the swingable mirror 2 which has been rotated by the angle $\theta$ for effecting the tracking control. The light beam reflected by the swingable mirror 2 passes through the focal point F of the objective lens 4 and is projected onto the record carrier 3 perpendicularly thereto. The light beam reflected by the record carrier 3 is introduced into the optical system 7 of the stationary unit 10 along the same light path along which the incident light beam has passed.

In the present embodiment, even though the distance from the stationary unit 10 and the movable unit 11 is varied, this does not affect the operation of the pick-up and the tracking error can be corrected accurately by driving the swingable mirror 2 and linearly moving mirror 9 in conjunction with each other.

Figure 7:
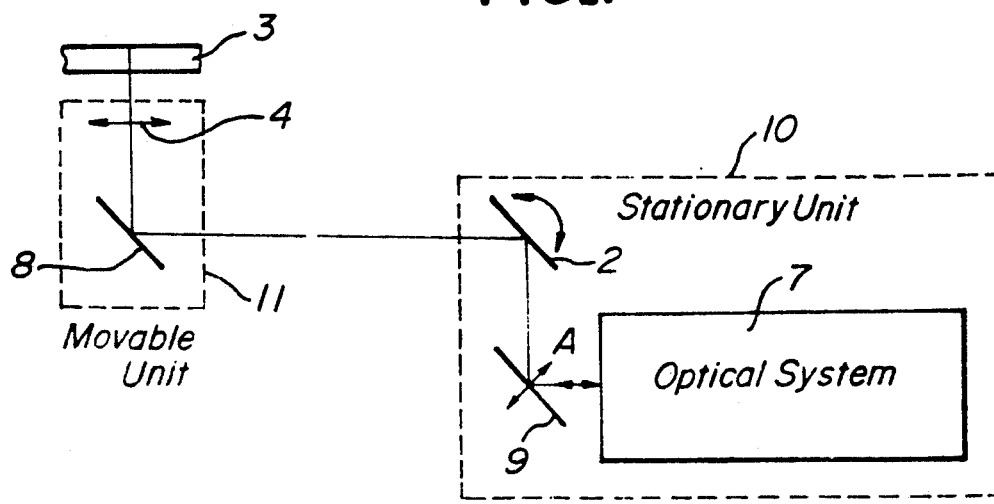
FIG. 7 is a schematic view illustrating a fourth embodiment of the optical pick-up according to the invention.

FIG. 7 shows a fourth embodiment of the optical pick-up according to the invention which is a modification of the embodiment shown in FIG. 6. In this embodiment, both the swingable tracking mirror 2 and the linearly moving mirror 9 are arranged in the stationary unit 10 and the stationary plane mirror 8 is arranged in the movable unit 11. In the present embodiment, the movable unit 11 becomes simpler in construction, smaller in size and light in weight, so that the high speed access can be realized. It should be noted that according to the invention, the beam shifting means may be arranged at any position on the light path between the collimator lens and the objective lens.

Figure 8:
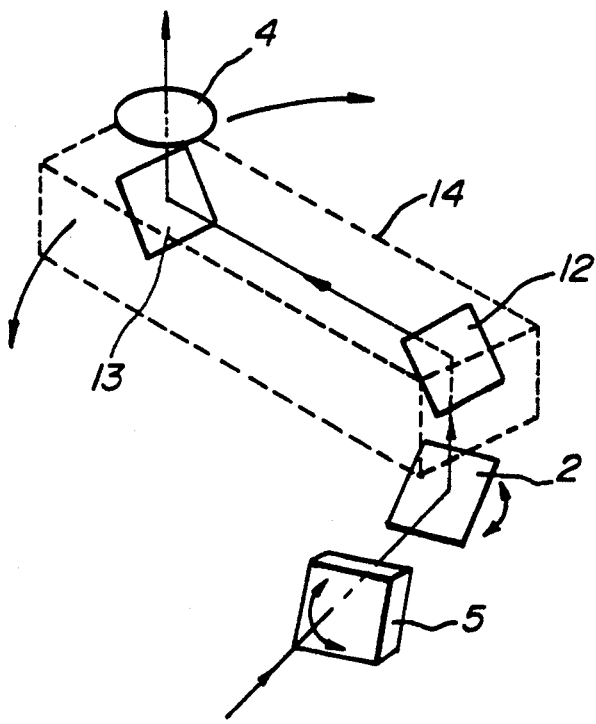
FIG. 8 is a schematic view showing a fifth embodiment of the optical pick-up according the invention.

FIG. 8 illustrates a fifth embodiment of the optical pick-up according to the invention. In the present embodiment, the invention is applied to the swing-arm type optical pick-up. The light beam x emitted form the optical system not shown is first deflected by the plano-parallelo plate 5 and is shifted from the optical axis by a given distance, and is then reflected by the swingable tracking mirror 2. The light beam emanating the tracking mirror 2 is then reflected by stationary plane mirrors 12 and 13 in succession, said mirrors being arranged in a swing-arm 14. The swing-arm 14 is arranged rotatably about an axis which situates in the light path between the tracking mirror 2 and the stationary mirror 12. The light beam reflected by the mirror 13 is projected by means of the objective lens 4 onto the record carrier not shown. Also in the present embodiment, the light beam reflected by the record carrier is made incident upon the optical system along the same light path as that of the incident light beam, so that the light spot formed on the light detector has the uniform intensity distribution and the tracking error can be detected accurately. Further, the plano-parallelo plate 5 and swingable tracking mirror 2 are arranged outside the swing-arm 14, so that the weight of the swing-arm can be reduced and thus the high speed access can be attained.

Figure 9:
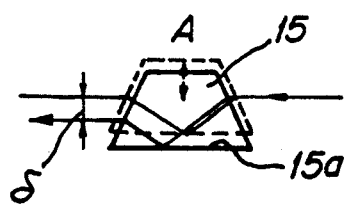
FIGS. 9, 10 and 11 are schematic views depicting few embodiments of the light beam deflecting means used in the pick-up according to the invention.
Figure 11:
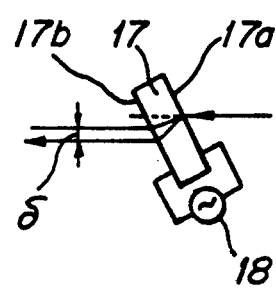
Figure 10:
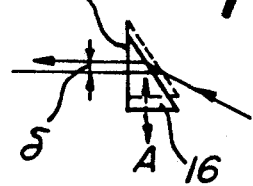

The present invention is not limited only to the embodiments explained above, but many modifications and alternations may be conceived by those skilled in the art within the scope of the invention. For instance, the light beam shifting means may be formed by various elements other than those described above. FIGS. 9, 10 and 11 show several embodiments of the light beam deflecting means for use if the optical pick-up according to the invention. In FIG. 9, a trapezoidal prism 15 is arranged to be shifted in a direction A to shift the light beam from the optical axis by the distance $\delta$. It should be noted that the direction A is perpendicular to the reflection surface 15a of prism 15. In FIG. 10, a triangular prism 16 is arranged to be moved in a direction A which is in parallel with the exit plane 16a of prism 16. In the embodiment illustrated in FIG. 11, there is provided a plano-parallelo plate 17 made of an opto-electric material whose refractive index is changed by an electric field which is produced by a voltage applied across incident and exit surfaces 17a and 17b of plate. To this end, a variable voltage source 18 is connected across the plate 17 so that the refraction angle of the light beam passing through the plate 17 is changed in accordance with the voltage generated from the variable voltage source 18 such that the light beam emanating from the plate is shifted from the optical axis by the predetermined distance $\delta$.

In the embodiments shown in the drawings, the tracking control is carried out by rotating the swingable mirror, but according to the invention the light source may be moved in a direction perpendicular to the optical axis. Further a relay lens or prism may be moved perpendicularly to the optical axis.

As explained above in detail, since the deviation of the light beam impinging upon the objective lens as well as the deviation of the light beam impinging upon the light detector can be corrected by providing the light beam shifting or deflecting means, any off set is not introduced in the tracking error signal and thus the tracking servo control can be effected accurately and stably. Further, the light beam shifting or deflecting means may be arranged in the stationary unit of the pick-up, so that the freedom in designing the optical elements can be increased and the weight of the movable unit can be decreased, so that the sensitivity of the tracking control can be improved and the high speed access can be achieved.

What is claimed is:

1. An optical pick-up comprising:
   light source means for emitting a light beam;
   beam collimating means for converting the light beam emitted from the light source means into a substantially parallel light beam;
   beam converging means for projecting the substantially parallel light beam onto an optical information record carrier as a light spot, information being recorded as a spiral track or concentric tracks on said record carrier;
   beam tilting means for tilting the light beam impinging upon the beam converging means such that the light beam is made incident upon the beam converging means at an inclination angle with respect to an optical axis of the beam converging means to move the light spot on the optical information record carrier in a tracking direction substantially perpendicular to the information track; and
   beam shifting means comprising a plano-parallelo plate arranged rotatably about an axis perpendicular to an optical axis of the beam collimating means, and arranged between said beam collimating means and said beam converging means for causing a parallel shift of said substantially parallel light beam in the tracking direction substantially perpendicular to the information track.

2. An optical pick-up as claimed in claim 1, wherein said plano-parallelo plate is made of opto-electric material whose refractive index is changed in accordance with an electric field applied thereto, and a variable voltage source for applying a variable voltage across said plate.

3. An optical pick-up as claimed in claim 1, wherein said beam converging means comprises an objective lens, said beam tilting means comprises a swingable tracking mirror, and said beam shifting means is constructed such that the light beam reflected by the swingable tracking mirror is made incident upon the objective lens through a focal point of the objective lens.

4. An optical pick-up as claimed in claim 3, wherein said beam shifting means is driven by a signal relating to a rotation angle of the swingable tracking mirror.

5. An optical pick-up as claimed in claim 1, wherein said beam converging means comprises an objective lens, said beam tilting means comprises a swingable tracking mirror, and said beam shifting means is constructed such that the light beam reflected by the swingable tracking mirror is made incident upon the objective lens through a center of an entrance pupil of the objective lens.

6. An optical pick-up comprising:

light source means for emitting a light beam;

beam collimating means for converting the light beam emitted from the light source means into a substantially parallel light beam;

beam converging means for projecting the substantially parallel light beam onto an optical information record carrier as a light spot, information being recorded as a spiral track or concentric tracks on said record carrier;

beam tilting means for tilting the light beam impinging upon the beam converging means such that the light beam is made incident upon the beam converging means at an inclination angle with respect to an optical axis of the beam converging means to move the light spot on the optical information record carrier in a tracking direction substantially perpendicular to the information track; and beam shifting means comprising a plano-parallelo plate arranged rotatably about an axis perpendicular to an optical axis of the beam collimating means, and arranged between said beam collimating means and said beam converging means for causing a parallel shift of said substantially parallel light beam in the tracking direction substantially perpendicular to the information track;

wherein said light source means, beam collimating means and beam shifting means are arranged in a stationary unit, and said beam converging means and said beam tilting means are arranged in a movable unit.

7. An optical pick-up comprising:

light source means for emitting a light beam;

beam collimating means for converting the light beam emitted from the light source means into a substantially parallel light beam;

beam converging means for projecting the substantially parallel light beam onto an optical information record carrier as a light spot, information being recorded as a spiral track or concentric tracks on said record carrier;

beam tilting means for tilting the light beam impinging upon the beam converging means such that the light beam is made incident upon the beam converging means at an inclination angle with respect to an optical axis of the beam converging means to move the light spot on the optical information record carrier in a tracking direction substantially perpendicular to the information track; and beam shifting means comprising a plano-parallelo plate arranged rotatably about an axis perpendicular to an optical axis of the beam collimating means, and between said beam collimating means and said beam converging means for causing a parallel shift of said substantially parallel light beam in the tracking direction substantially perpendicular to the information track;

wherein said light source means, beam collimating means, beam shifting means and beam tilting means are arranged in a stationary unit, and said beam converging means is arranged in a moveable unit.

* * * * *